US008376884B2

(12) United States Patent
Spaggiari

(10) Patent No.: US 8,376,884 B2
(45) Date of Patent: Feb. 19, 2013

(54) VENTILATING SYSTEM FOR MOTOR VEHICLES

(75) Inventor: Alessandro Spaggiari, Correggio (IT)

(73) Assignee: Spal Automotive S.r.l. (IT)

( * ) Notice: Subject to any disclaimer, the term of this patent is extended or adjusted under 35 U.S.C. 154(b) by 1127 days.

(21) Appl. No.: 11/661,553

(22) PCT Filed: Nov. 24, 2005

(86) PCT No.: PCT/IB2005/003590
§ 371 (c)(1),
(2), (4) Date: Mar. 1, 2007

(87) PCT Pub. No.: WO2006/059204
PCT Pub. Date: Jun. 8, 2006

(65) Prior Publication Data
US 2008/0020698 A1    Jan. 24, 2008

(30) Foreign Application Priority Data
Nov. 30, 2004  (IT) .............................. BO2004A0743

(51) Int. Cl.
*H05K 5/03* (2006.01)
(52) U.S. Cl. ........................................................ 474/184
(58) Field of Classification Search .................. 454/118, 454/184, 139
See application file for complete search history.

(56) References Cited

U.S. PATENT DOCUMENTS

| 3,019,965 | A | 2/1962 | Lyman | |
|---|---|---|---|---|
| 4,549,858 | A | 10/1985 | Vettori et al. | |
| 5,407,324 | A | 4/1995 | Starnes, Jr. et al. | |
| 6,000,951 | A * | 12/1999 | Hansen et al. | 439/67 |
| 6,549,406 | B1 * | 4/2003 | Olesiewicz et al. | 361/695 |
| 6,805,623 | B2 * | 10/2004 | Robison et al. | 454/143 |
| 6,866,577 | B2 * | 3/2005 | Gough et al. | 454/184 |
| 6,868,219 | B2 * | 3/2005 | Lipski et al. | 385/135 |
| 7,505,266 | B2 * | 3/2009 | Sanchez et al. | 361/695 |
| 7,862,410 | B2 * | 1/2011 | McMahan et al. | 454/184 |
| 2002/0094772 | A1 * | 7/2002 | Gough | 454/184 |
| 2002/0191376 | A1 * | 12/2002 | Ota et al. | 361/695 |
| 2003/0026074 | A1 * | 2/2003 | Clements et al. | 361/695 |
| 2003/0051387 | A1 * | 3/2003 | Rodgers | 43/1 |

(Continued)

FOREIGN PATENT DOCUMENTS

| EP | 0 186 581 B1 | 3/1988 |
|---|---|---|
| FR | 2 772 844 | 6/1999 |

*Primary Examiner* — Steven B McAllister
*Assistant Examiner* — Samantha Miller
(74) *Attorney, Agent, or Firm* — Timothy J. Klima; Shuttleworth & Ingersoll, PLC

(57) ABSTRACT

A ventilating system, especially for a motor vehicle air conditioning system, comprises: a wall (4) for mounting an axial fan (2), the latter being equipped with a ring-shaped casing (6), with an axis (X), defined externally by a cylindrical wall (7); an electric motor (11) supported by a plurality of radial spokes (10) connected to the ring-shaped casing (6) and having an impeller (12) at the end of its output shaft; a power cable (14) connected at one end to the motor (11) and connectable at the other end to an electrical power source through a connector (14a). The axial fan (2) is mounted on the wall (4), which delimits a space (5) for containing the air conditioning system, at an air opening (3), in such a way that the impeller (12) faces the inside of the space (5) and the motor (11) faces the outside. The ring-shaped casing (6) comprises means (19) for fastening the cable (14) to its cylindrical outside surface (18) and defining a passage (25) for the cable (14) through the mounting wall (4).

11 Claims, 3 Drawing Sheets

U.S. PATENT DOCUMENTS

| | | | |
|---|---|---|---|
| 2003/0228840 A1* | 12/2003 | Gough et al. | 454/184 |
| 2004/0007348 A1* | 1/2004 | Stoller | 165/47 |
| 2004/0035183 A1* | 2/2004 | O'Brien et al. | 73/23.36 |
| 2004/0115986 A1* | 6/2004 | Chen | 439/485 |
| 2004/0121719 A1* | 6/2004 | Robison et al. | 454/143 |
| 2004/0125348 A1* | 7/2004 | Carkner | 353/119 |
| 2004/0140350 A1* | 7/2004 | Valencia et al. | 235/375 |
| 2004/0142232 A1* | 7/2004 | Risca et al. | 429/100 |
| 2004/0240824 A1* | 12/2004 | Lipski et al. | 385/135 |
| 2004/0240882 A1* | 12/2004 | Lipski et al. | 398/41 |
| 2005/0081834 A1* | 4/2005 | Perkins | 123/563 |
| 2005/0227608 A1* | 10/2005 | Wu et al. | 454/184 |
| 2006/0122762 A1* | 6/2006 | Perkins | 701/102 |
| 2006/0144126 A1* | 7/2006 | O'Brien et al. | 73/23.42 |
| 2006/0211294 A1* | 9/2006 | Lipski et al. | 439/488 |
| 2006/0215358 A1* | 9/2006 | Campbell | 361/683 |

* cited by examiner

VENTILATING SYSTEM FOR MOTOR VEHICLES

TECHNICAL FIELD

This invention relates to a ventilating system, especially for motor vehicles, that is to say, a system for conditioning the air and/or cooling engines in motor vehicles.

These systems include a fan, usually of the axial type, designed to direct an air flow against a heat exchange device.

BACKGROUND ART

As is known, fans used for this purpose comprise a casing, commonly known as shroud, shaped like a ring and externally defined by a cylindrical wall. The shroud has a plurality of radial arms that support an electric motor mounted at the centre of it. The motor output shaft is coaxial with the cylindrical wall. The free end of the motor shaft is integral with an impeller consisting of a plurality of vanes.

A cable connects the motor to an electrical power source inside the vehicle.

As is known, fans of this type are fixed to the inside face of a mounting wall, at an air opening in the mounting wall itself, the latter delimiting a closed space containing components that form part of the conditioning and/or cooling systems.

This means that the impeller, relative to the radial arms of the fan shroud, faces the air opening towards the outside, whilst the electric motor faces the inside of the closed space. Thus, the power cable of the motor follows a path inside the vehicle to connect up to the respective power source.

In practice, it has been found that this type of structure may lead to problems during installation, removal and maintenance of the axial fan on account of the confined spaces making work on the fan difficult and time-consuming.

DISCLOSURE OF THE INVENTION

This invention has for an aim to propose a ventilating system, equipped with an axial fan, that is quick and easy to install and remove.

This invention accordingly provides a ventilating system, equipped with an axial fan, comprising the characteristics described in one or more of the appended claims.

BRIEF DESCRIPTION OF THE DRAWINGS

Further characteristics and advantages of the invention are more apparent in the detailed description below, with reference to a preferred, non-restricting, embodiment of an axial fan, illustrated in the accompanying drawings, in which:

FIG. 6 is a lateral section view of a scaled-up detail from FIG. 1.

DETAILED DESCRIPTION OF THE PREFERRED EMBODIMENTS OF THE INVENTION

Figure 1:
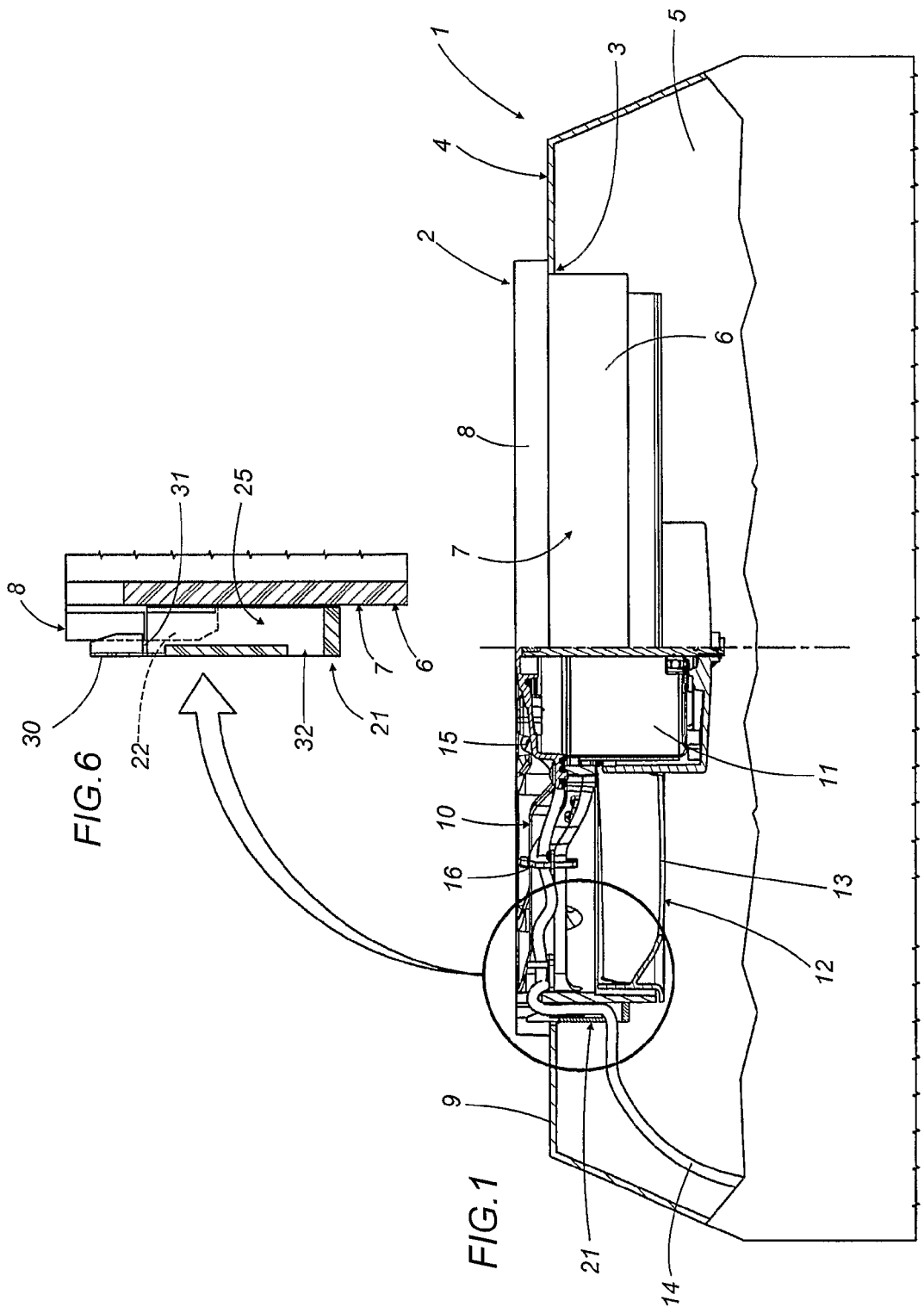
FIG. 1 is a schematic side view, partly in cross section, of a part of a ventilating system equipped with an axial fan according to the present invention.
Figure 2:
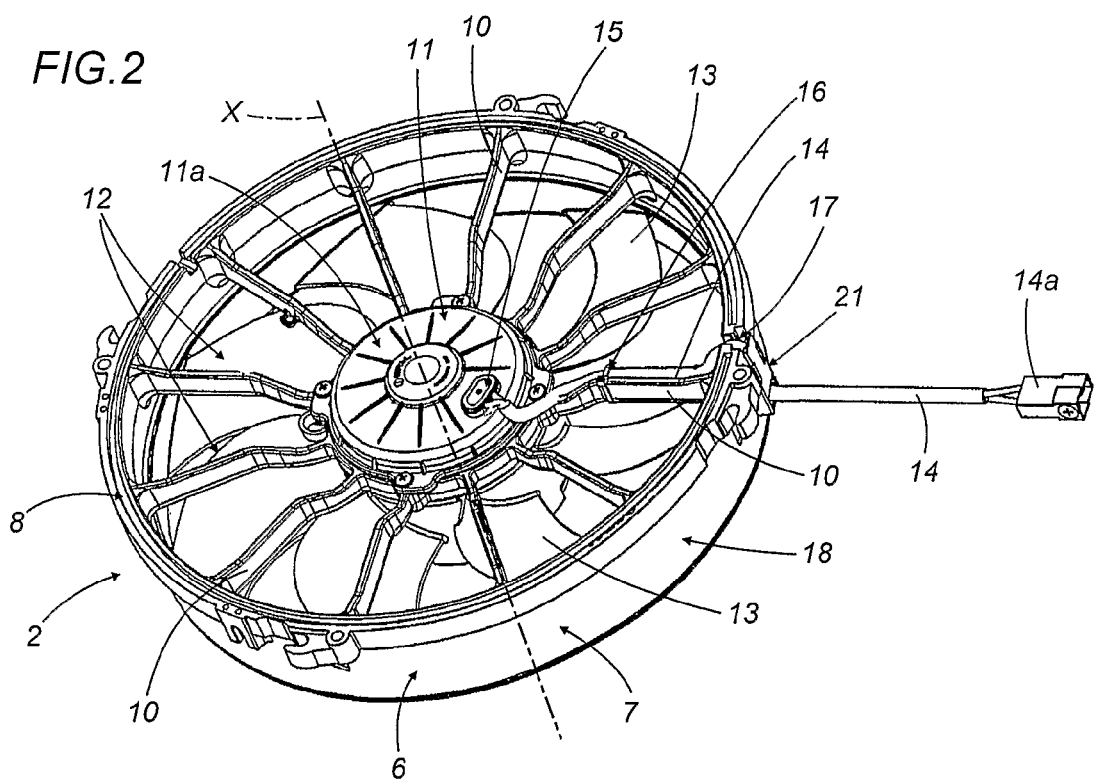
FIG. 2 is a perspective view of the axial fan of FIG. 1.
Figure 5:
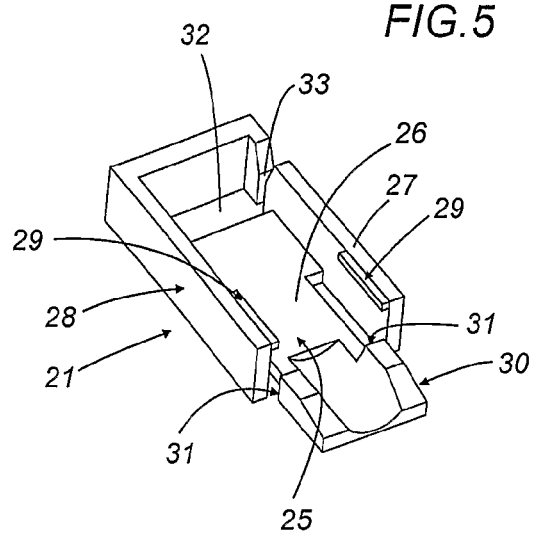
FIG. 5 is a perspective view of a detail from FIGS. 1 to 4.
Figure 3:
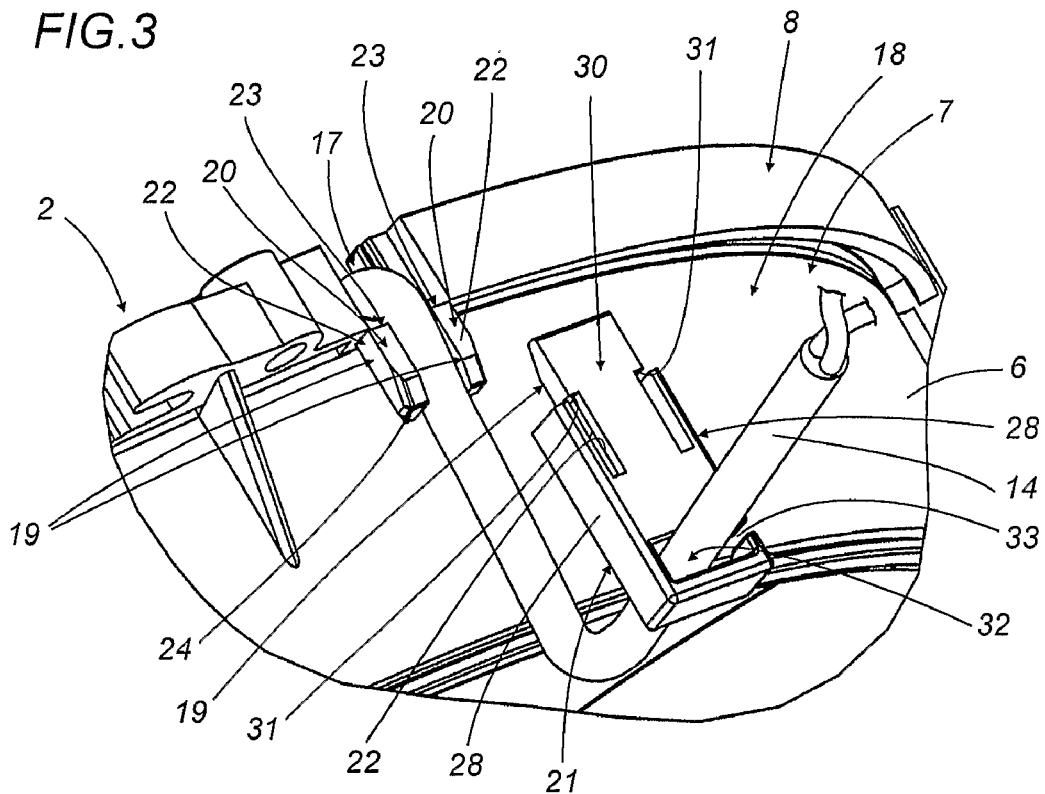
FIGS. 3 and 4 are scaled-up perspective views of a part of the axial fan of FIG. 2.
Figure 4:
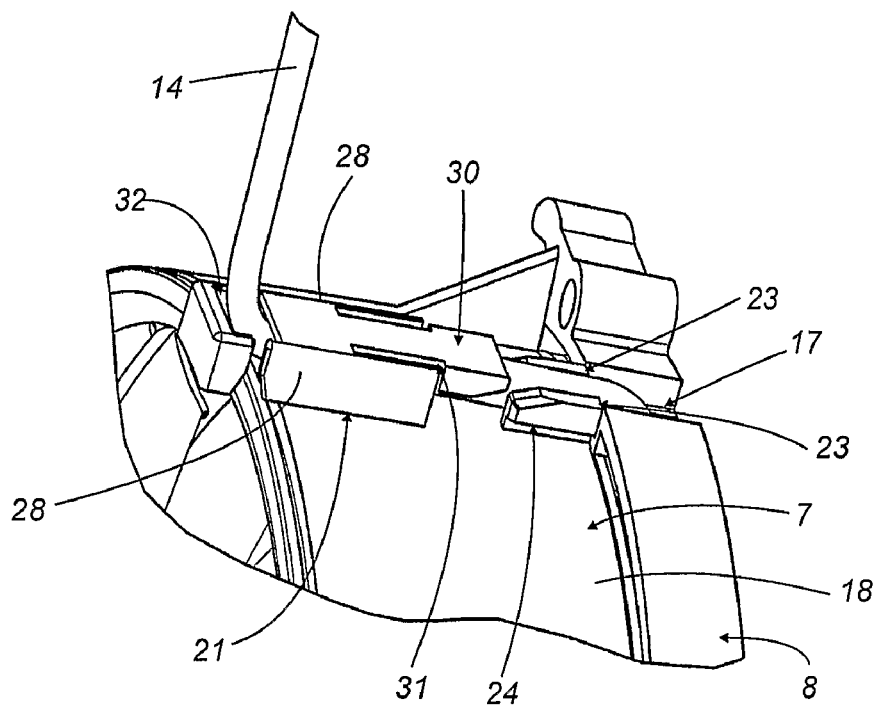

With reference to FIGS. 1 and 2, the numeral 1 denotes in its entirety a ventilating system, especially for a motor vehicle, designed for example to be used for the vehicle's air conditioning system and/or to cool its engine.

The system comprises an axial fan 2 mounted at an opening 3 made in a mounting wall 4 delimiting the top of a space 5 for housing the components of the system 1.

The fan 2 comprises a ring-shaped casing 6, whose axis is labelled X, which is externally defined by a cylindrical wall 7 and which constitutes a shroud for directing an air flow. The ring-shaped casing 6 has, at the top of it, a flange 8 and is fitted in the opening 3 in such a way that it can be extracted and abuts with the lower edge of the flange 8 against the outside surface 9 of the wall 4.

The ring-shaped casing 6 has a plurality of radial arms or spokes 10 for supporting a motor 11 whose output shaft, which is coaxial with the axis X, mounts at the free end of it inside the space 5, an impeller 12 comprising a plurality of vanes 13 causing the conditioning and/or cooling air to flow from the outside to the inside of the space 5.

It should be noted that the impeller 12 might, if necessary, cause the air to flow from the inside to the outside of the space 5.

The electric motor 11 is connected to an electrical power source (not illustrated) through a power cable 14 which, starting from an electrical power socket 15 located on the top cover 11a of the motor 11, outside the space 5, extends radially along a first path section above the spokes 10 and is held against them by a clip 16.

The cable 14 then passes through a U-shaped slot, labelled 17, in the flange 8 and runs along the cylindrical outside surface 18 of the ring-shaped casing 6.

Advantageously, the cable 14 is held in contact with the cylindrical surface 18 by fastening means labelled 19 in their entirety.

Thus, the power cable 14 leading out of the socket 15 of the electric motor 11 passes through the fastening means 19 and either directly or indirectly reaches the electrical power source located inside the space 5, to which it can be connected through a connector 14a.

The fastening means 19 comprise retaining means, labelled 20 in their entirety, integral with the ring-shaped casing 6, and a locking device 21 for holding the cable 14 securely against the outside surface 18.

The retaining means 20 consist of a pair of protrusions 22 parallel to the axis X and integral with the cylindrical surface 18 of the ring-shaped casing 6. The protrusions 22 are defined at the top by two surfaces 23 transversal to the axis X and, in a direction parallel to the latter, have two longitudinal grooves 24 facing the outside.

The locking device 21, which is removably pressure fitted on the protrusions 22, forms, together with the latter, a passage 25 for the power cable 14.

More specifically, the locking device 21 comprises a bottom wall 26 and a pair of walls 27 and 28 parallel with each other and perpendicular to the bottom wall 26.

The walls 27 and 28 have respective ribs 29, extending in a direction parallel with the axis X, and which are pressure fitted inside the grooves 24 of the protrusions 22, in such a way as to form radial locking means of the locking device 21.

At a first end of it, the bottom wall 26 has a flexible portion 30 extending past the ends of the two walls 27 and 28.

The portion 30 has, on the side of it facing the two ribs 29, a pair of shoulders 31, extending transversally to the axis X and which abut against the transversal surfaces 23 of the protrusions 22, in such a way as to form axial locking means of the device 21 itself.

It should be noticed that the flexible portion 30 of the locking device 21 faces the U-shaped slot 17 made in the flange 8.

At a second end of it, the locking device 21 has an opening 32 defining an outlet from the passage 25 though which the power cable 14 leads out of the ring-shaped casing 6 inside the space 5.

In this regard, it should be noticed that, at the opening 32, the wall 27 has a slot 33 designed to allow the cable 14 to be inserted and pulled out without having to remove the connector 14a.

To detach the locking device 21 from the fastening means 19 it is sufficient to manually bend the flexible portion 30 in such a way as to release the shoulders 31 from the transversal surfaces 23 of the protrusions 22 and slide the device 21 in an axial direction.

The invention achieves the aforementioned aims because the locking device 21 makes it possible to fasten the power cable 14 directly to the cylindrical outside surface 18 of the shroud, thus enabling the fan to be quickly and easily fitted to and removed from the mounting wall 4 through the opening 3.

Furthermore, there is practically no interference between the power cable 14 and the impeller 12 since the power cable is attached to the ring-shaped casing 6, which means that the power cable moves as one with the fan when the latter is moved from its position.

The invention claimed is:

1. A ventilating system, especially for motor vehicles air, comprising:
   a mounting wall (4) delimiting a space (5) for containing the system (1);
   an axial fan (2) mounted on both sides of the mounting wall (4) and comprising a ring-shaped casing (6) with a cylindrical outside surface (18); a motor (11) mounted on the ring-shaped casing (6);
   an impeller (12), with vanes (13), coaxial with the axis (X) of the ring-shaped casing (6) and keyed to the output shaft of the motor (11); and a power cable (14) connected to the electric motor and connectable to an electrical power source inside the space (5),
   the ventilating system being characterised in that the axial fan (2) is mounted on the wall (4) at an air opening (3), in such a way that the impeller (12) faces the inside of the space (5) and the motor (11) faces the outside; and
   the ring-shaped casing (6) comprising means (19) for fastening the cable (14) to its cylindrical outside surface (18) and defining a passage (25) for the cable (14) through the mounting wall (4).

2. The system according to claim 1, characterised in that the fan (2) has a flange (8) and is fitted in the opening (3) in such a way that it can be extracted, abutting with the flange (8) against the outside surface (9) of the wall (4).

3. The system according to claim 1, characterised in that the fastening means (19) comprise retaining means (20) integral with the ring-shaped casing (6), and a cable (14) locking device (21);
   the locking device (21) being removable and slotting into the retaining means (20) in such a way as to define the passage (25) for the cable (14).

4. The system according to claim 3, characterised in that the ring-shaped casing (6) has a U-shaped slot made in the vicinity of the retaining means (20), facing a first end of the locking device (21) and allowing the power cable (14) to pass through it.

5. The system according to claim 3, characterised in that the locking device (21) has at a second end of it an opening (32) defining an outlet, inside the space (5), through which the power cable (14) leads out of the ring-shaped casing (6).

6. The system according to claim 1, characterised in that the locking device (21) comprises a bottom wall (26) having a flexible portion (30) in the vicinity of its first end, and a pair of walls (27, 28) substantially parallel with each other and at right angles to the bottom wall (26);
   the side walls (26, 27) and the flexible portion (30) respectively comprising radial locking means (29) and axial locking means (31) of the locking device (21) with respect to the retaining means (20).

7. The system according to claim 6, characterised in that the radial locking means (29) are defined by two ribs extending in a direction substantially parallel with the axis (X) from the opposite inside faces of the two side walls (27, 28); and
   the axial locking means (31) are defined by a pair of shoulders extending transversally to the axis (X) and made on the bottom wall (26) close to the free end of the flexible portion (30).

8. The system according to claim 7, characterised in that the retaining means (20) are defined by a pair of protrusions (22) having two longitudinal grooves (24), substantially parallel with the axis (X) of the ring-shaped casing (6), for accommodating the ribs (29), and two surfaces (23) transversal to the axis (X) for abutting against the shoulders (31).

9. The system according to claim 5, characterised in that, at the outlet opening (32) for the power cable (14), one of the two side walls has a slot (33) through which the cable (14) can pass.

10. The system according to claim 1, characterised in that it comprises a plurality of spokes (10) for attaching the electric motor (11) to the ring-shaped casing (6).

11. The system according to claim 10, characterised in that the connecting cable (14) is fastened to one of the spokes (10) to extend at least from the electric motor (11) to the U-shaped slot.

* * * * *